United States Patent [19]
Sato

[11] Patent Number: 5,940,649
[45] Date of Patent: Aug. 17, 1999

[54] CHECK DEVICE OF ELECTRO-DEVELOPING TYPE CAMERA

[75] Inventor: Koichi Sato, Tokyo, Japan

[73] Assignee: Asahi Kogyo Kabushiki Kaisha, Tokyo, Japan

[21] Appl. No.: 08/796,036

[22] Filed: Feb. 5, 1997

[30] Foreign Application Priority Data

Feb. 14, 1996 [JP] Japan ................................ P08-050919

[51] Int. Cl.⁶ .................................................. G03B 19/00
[52] U.S. Cl. ............................................................ 396/429
[58] Field of Search ............................ 396/30, 429, 430; 349/24, 25, 33

[56] References Cited

U.S. PATENT DOCUMENTS 4,945,423  7/1990  Takanashi et al. ...................... 358/300
5,424,156  6/1995  Aoki et al. .
5,488,601  1/1996  Sakano et al. ........................... 369/120
5,555,205  9/1996  Okabe ..................................... 365/108

FOREIGN PATENT DOCUMENTS 5-2280  1/1993  Japan .

*Primary Examiner*—Safet Metjahic
*Assistant Examiner*—John Chizmar
*Attorney, Agent, or Firm*—Greenblum & Bernstein, P.L.C.

[57] ABSTRACT

A check device of electro-developing type camera using an electro-developing recording medium, to electronically develop an image. The electro-developing recording medium is illuminated by a light source, so that an image recorded on the electro-developing recording medium is read by a light sensor. When reading the image, the line sensor is moved along the electro-developing recording medium by a scan mechanism. Based upon an image signal read by the line sensor, it is determined whether or not the image has been successfully erased.

15 Claims, 16 Drawing Sheets

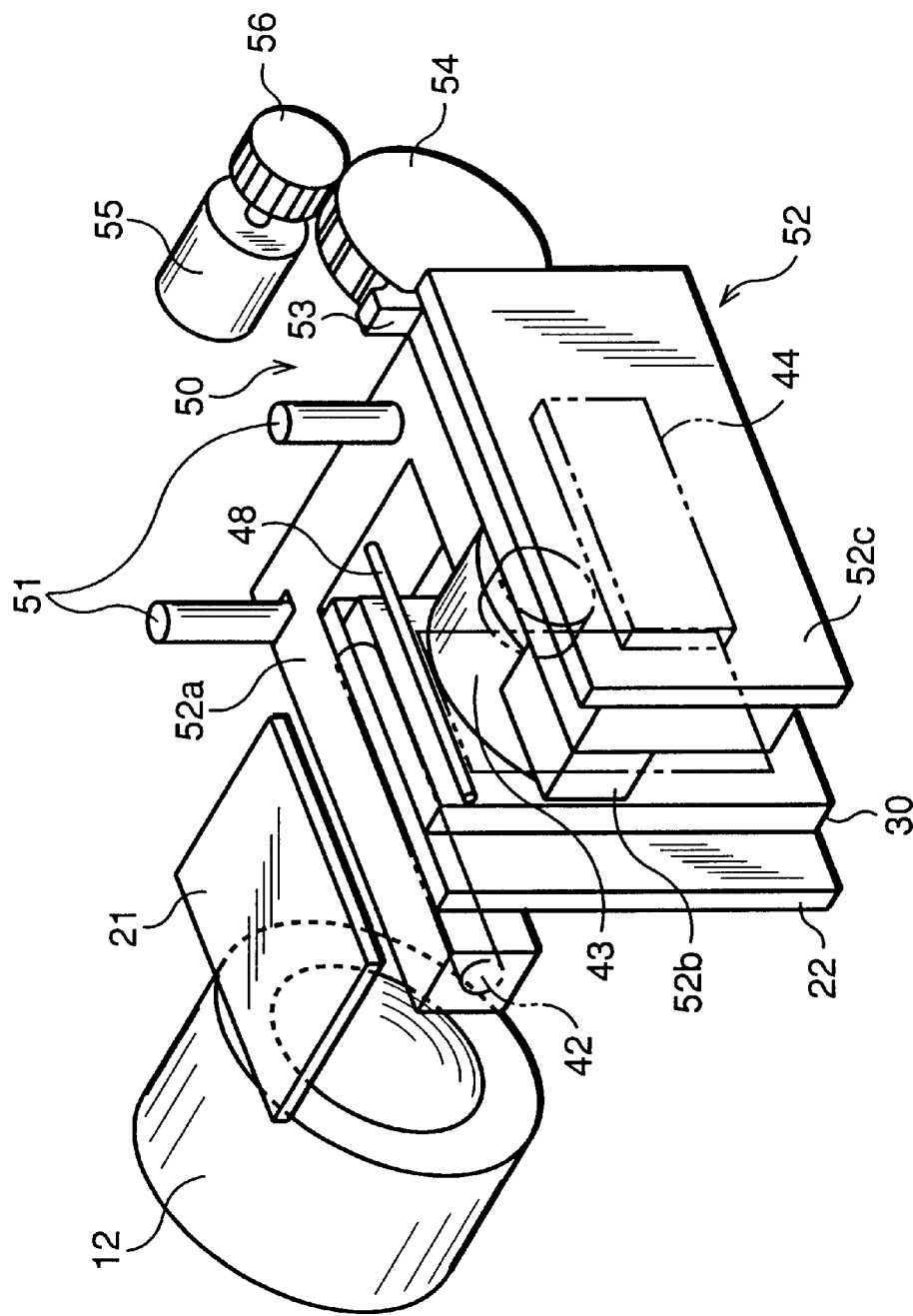

CHECK DEVICE OF ELECTRO-DEVELOPING TYPE CAMERA

BACKGROUND OF THE INVENTION

1. Field of the Invention

The present invention relates to a camera using a recording medium in which an object image obtained through a photographing optical system is electronically developed, and more particularly, to a device for checking a recording state of the recording medium.

2. Description of the Related Art

Conventionally, as disclosed in Japanese Unexamined Patent Publication No. 5-2280 and U.S. Pat. No. 5,424,156, there is known a photographic material which is directly developed electronically so that the developed visible image can be immediately obtained. In this specification, such a recording medium is referred to as an electro-developing recording medium, and an electronic still camera using the electro-developing recording medium is referred to as an electro-developing type camera.

An image recorded on the electro-developing recording medium can be erased by heating the recording medium at a predetermined temperature. However, if recording and erasing operations to the electro-developing recording medium are repeatedly carried out, a problem would occur in which the electro-developing recording medium is deteriorated, and thus a clear image cannot be recorded thereon. Similarly, when the erasing operation is not performed satisfactorily, a problem would occur in which a clear image cannot be recorded on the electro-developing recording medium.

SUMMARY OF THE INVENTION

Therefore, an object of the present invention is to provide a check device by which a recording state of an electro-developing recording medium is checked, so that a clear image can be recorded on the recording medium in the next recording operation.

According to the present invention, there is provided a check device, which is mounted in an electro-developing type camera using the electro-developing recording medium, the check device comprising a light source, an optical sensor, a moving mechanism, and a recording state check processor.

The light source illuminates the electro-developing recording medium. The optical sensor reads the image recorded on the electro-developing recording medium, which is being illuminated by the light source, to output an image signal corresponding to the image. The moving mechanism moves one of the optical sensor and the electro-developing recording medium so that the image is read by the optical sensor. The recording state check processor checks a recording state of the electro-developing recording medium based on the image signal.

Further, according to the present invention, there is provided a device for checking a recording state of the electro-developing recording medium, the check device comprising an optical sensor and a recording state check processor.

The optical sensor scans the electro-developing recording medium to read the image recorded on the electro-developing recording medium. The recording state check processor checks a recording state of the electro-developing recording medium based on an image signal outputted by the optical sensor.

BRIEF DESCRIPTION OF THE DRAWINGS

The objects and advantages of the present invention will be better understood from the following description, with reference to the accompanying drawings in which:

FIG. 4 is a perspective view showing a scanning mechanism;

DESCRIPTION OF THE PREFERRED EMBODIMENTS

Figure 1:
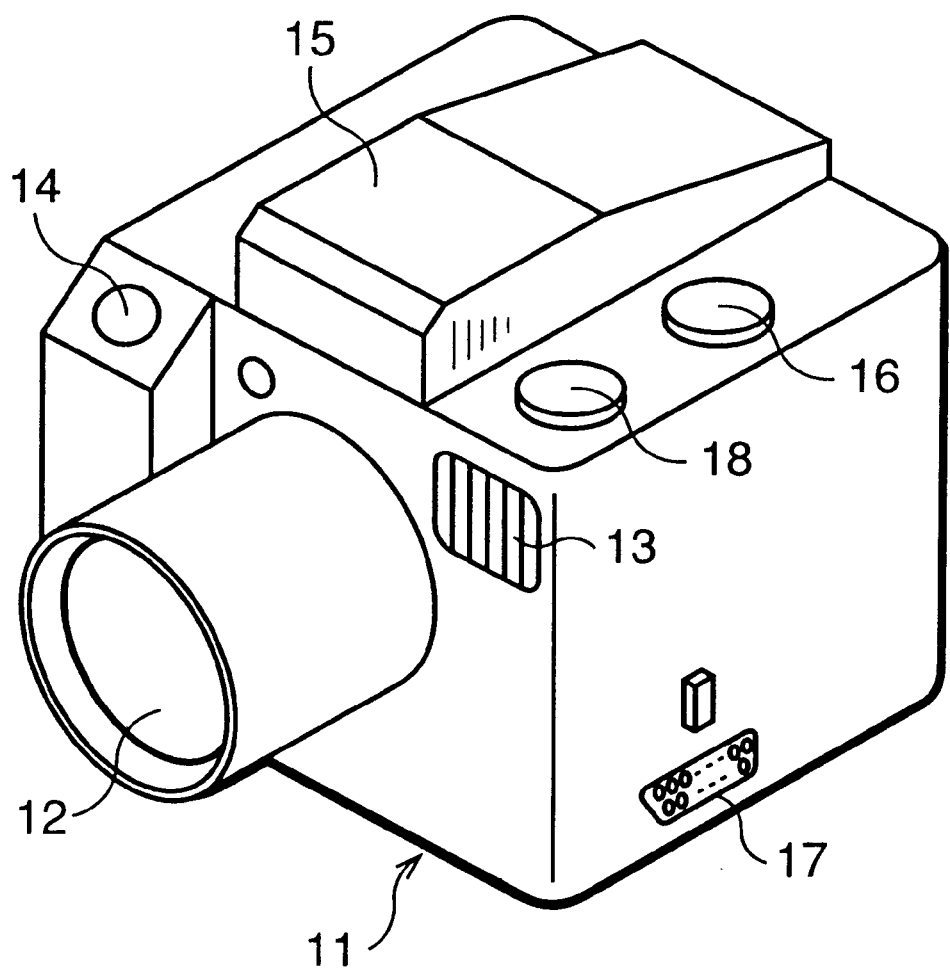
FIG. 1 is an external view showing an electro-developing type camera to which an embodiment of the present invention is applied.

FIG. 1 is an external view of an electro-developing type camera to which an embodiment according to the present invention is applied.

When viewing a camera body 11 from a front side, a photographing optical system 12, including a photographing lens system and so on, is provided approximately at a center portion of the front surface of the camera body 11. An electronic flash 13 is disposed thereon to the right of and above the photographing optical system 12. A release switch 14 is provided on a side opposite to the electronic flash 13.

On an upper surface of the camera body 11, a view finder is provided at a center portion thereof and is extended from a front to a rear end of the camera body 11. A mode select switch 16 is provided on the upper surface and beside the view finder 15. An output terminal 17 is provided on a lower portion of a side surface of the camera body 11, so that an image signal obtained by this camera can be outputted to an external recording device (not shown).

Figure 2:
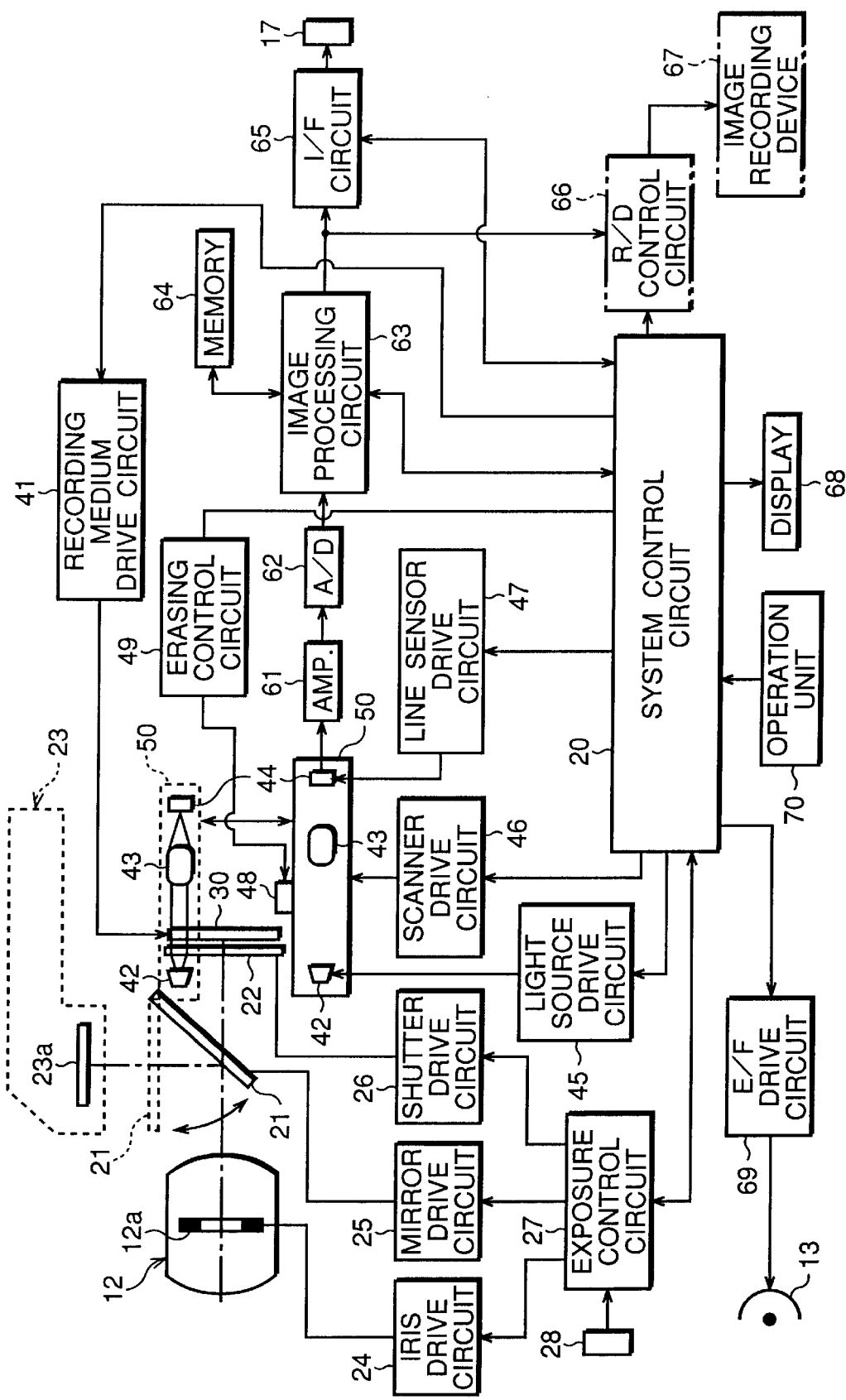
FIG. 2 is a block diagram of the electro-developing type camera shown in FIG. 1.

FIG. 2 is a block diagram of the electro-developing type camera, in which a system control circuit 20, including a microcomputer, is mounted to control the electro-developing type camera as a whole.

The photographing optical system 12 has a plurality of lens groups and an aperture 12a. An electro-developing recording medium 30 is disposed behind the photographing optical system 12. A quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is directed to the view-finder optical system 23 to form an object image on the focusing glass 23a, and thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, thus forming a two-dimensional image thereon.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42, a scanner optical system 43, a line sensor 44, and an erasing device 48 are supported by the scanning mechanism 50, and are moved along the electro-developing recording medium 30 by a scanning operation of the scanning mechanism 50.

The light source 42 has a plurality of LED (photodiodes), and can be moved along a front surface of the shutter 22 or the front surface of the electro-developing recording medium 30. The line sensor 44 may be a one-dimensional CCD sensor of 2000 pixels, for example. The line sensor 44 may be of a suitable length to completely cover and extend over one horizontal scanning line of the image formed on the electro-developing recording medium 30. The line sensor 44 serves as a photoelectric-conversion device, which converts an optical image to an electric signal. The line sensor 44 can be moved along the rear surface of the electro-developing recording medium 30, together with the light source 42. The scanner optical system 43 is disposed between the light source 42 and the line sensor 44. When a scanning operation is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44, through an operation of the scanner optical system 43. Namely, the scanner optical system 43 is disposed on the optical path of the light beam which passes through the electro-developing recording medium 30, and the line sensor 44 is moved in an imaging plane, on which an image is formed by the scanner optical system 43.

ON and OFF control and the intensity control of the light source 42 are performed by a light source drive circuit 45. Control of the reading operation of pixel signals generated in the line sensor 44 is carried out by a line sensor drive circuit 47. Control of the movement of the scanning mechanism 50 is performed by a scanner drive circuit 46. The circuits 45, 46, and 47 are controlled by the system control circuit 20.

An erasing device 48 is provided with a heater for heating the electro-developing recording medium 30, and can be moved along the rear surface thereof. ON and OFF control of the heater of the erasing device 48 is carried out by an erasing control circuit 49 based on an erasing command signal outputted by the system control circuit 20. When the electro-developing recording medium 30 is heated by the erasing device 48, an image recorded on the electro-developing recording medium 30 is erased.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth pixel signals.

The pixel signals read from the memory 64 are inputted to an interface circuit 65 through the image processing circuit 63, so that the pixel signals are subjected to a predetermined process such as a format conversion, and can then be outputted to an external computer (not shown) through the output terminal 17. The pixel signals outputted from the image process circuit 63 are subjected to a predetermined process, such as an image compression and a format conversion in a recording device control circuit 66, so that the pixel signals can be recorded on a recording medium, such as an IC memory card, for example, in an image recording device 67. The interface circuit 65 and the recording device control circuit 66 are operated in accordance with a command signal outputted from the system control circuit 20.

An operation unit 70, including the release switch 14, the mode select switch 16, and so on, are connected to the system control circuit 20. A photography operation (i.e., a recording operation), a reading operation, and an erasing operation of the image signal are performed by operating the release switch 14 and the mode select switch 16, as described later. A display device 68 is connected to the system control circuit 20 to indicate various setting conditions of the electro-developing type camera. Further, an electric flash drive circuit 69 is connected to the system control circuit 20 to control the flash operation of the electronic flash 13.

Figure 3:
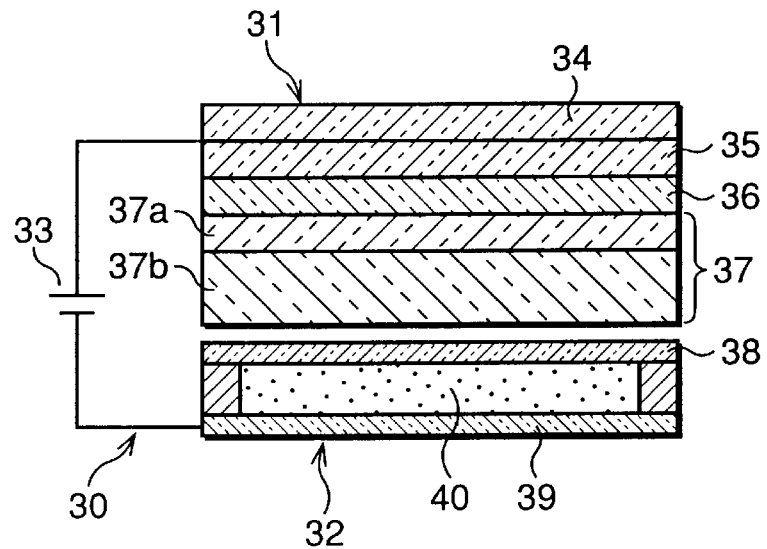
FIG. 3 is a view showing a structure of an electro-developing recording medium.

FIG. 3 shows a structure of the electro-developing recording medium 30, which is basically the same as that shown in Japanese Unexamined Patent Publication No. 5-2280.

The electro-developing recording medium 30 has an electrostatic information recording medium 31 and an electric charge storage medium 32. An electric voltage is applied thereto by an electric power source 33. The electric power source 33 corresponds to the recording medium drive circuit 41, so that ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an object image is developed. Namely, the visible image is generated in accordance with the electric charge.

The electric charge storage medium 32 is a liquid crystal display (i.e., LCD) having a memory-type liquid crystal, and thus, the developed visible image is held therein even if the electric field is removed. The developed visible image of the LCD can be erased by heating it, using a laser beam at a predetermined temperature. As a result, the same electric charge storage medium 32 can be used repeatedly.

FIG. 4 shows the structure of the scanning mechanism 50, and members provided around the mechanism 50.

The scanning mechanism 50 has a moving member 52 which is slidably supported by a pair of guide shafts 51 and has first and second leg portions 52a and 52b and a support portion 52c. The first leg portion 52a extends between the quick return mirror 21 and the shutter 22, and the second leg portion 52b extends behind the electro-developing recording medium 30. The support portion 52c is provided behind the second leg portion 52b. The light source 42, the scanner optical system 43, and the line sensor 44 are attached to the first leg portion 52a, the second leg portion 52b, and the support portion 52c, respectively. The erasing device 48 has a linear electric heater, and is provided between the first and second leg portions 52a and 52b. The light source 42, the line sensor 44, and the erasing device 48 extend in a horizontal direction, respectively.

A rack 53 fixed to the moving member 52 meshes with a pinion 54, which meshes with a gear 56 provided on an output shaft of a scan drive motor 55.

When a reading operation and an erasing operation of the image signal recorded on the electro-developing recording medium 30 are not performed, the moving member 52 is in a position offset from a path between the photographing optical system 12 and the electro-developing recording medium 30; this position being below the electro-developing recording medium 30, for example. As described later, when an image recorded on the electro-developing recording medium 30 is read, the scan drive motor 55 is rotated, and thus, the moving member 52 is moved upward so that a scan of the line sensor 44 is carried out, and the line sensor 44 is moved in a direction perpendicular to the longitudinal direction of the line sensor 44. Similarly, when the image recorded on the electro-developing recording medium 30 is erased, the moving member 52 is moved upward by the operation of the scan drive motor 55, and thus, the erasing device 48 is moved in a direction perpendicular to the width of the electro-developing recording medium 30.

Figure 5:
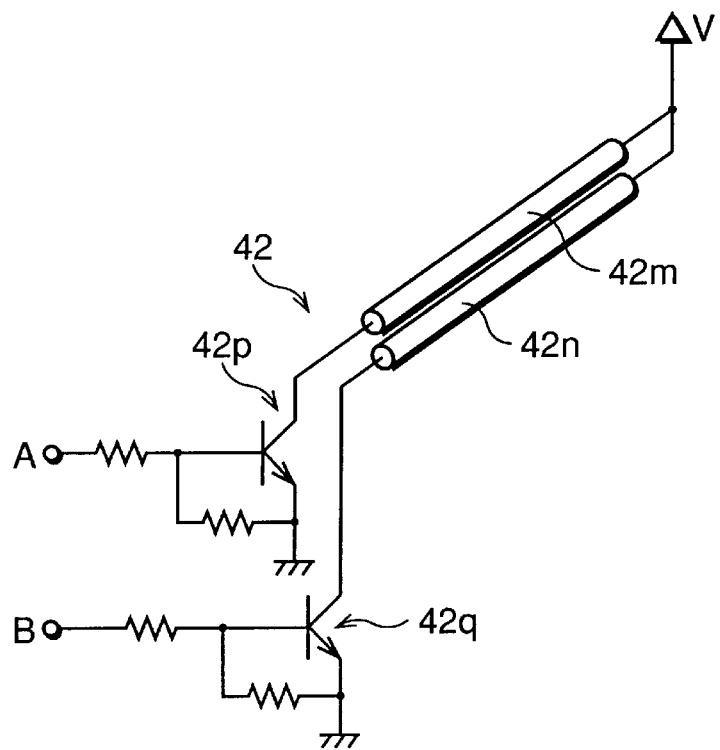
FIG. 5 is a schematic view showing an electrical structure of a light source.

FIG. 5 is a schematic view showing an electrical structure of the light source 42. The light source 42 is provided with a first light source unit 42m for a reading operation and a second light source unit 42n for a checking operation. One terminal of the first light source unit 42m is connected to a power source V, and another terminal of the first light source unit 42m is connected to a collector of a first transistor 42p. One terminal of the second light source unit 42n is connected to the power source V, and another terminal of the second light source unit 42n is connected to a collector of a second transistor 42q. Emitters of the first and second transistors 42p and 42q are grounded, and electric voltages corresponding to control signals (A) and (B) outputted by the system control circuit 20 are applied to the bases of the transistors 42p and 42q. The transistors 42p and 42q operate as switches, so that, when a voltage exceeding a predetermined value is applied to each of the bases of the transistors 42p and 42q, the switches are closed. Therefore, when the control signal (A) is high level ("HI"), a light beam for the reading operation is emitted by the first light source unit 42m, and when the control signal (B) is HI, a light beam for the checking operation is emitted by the second light source unit 42n.

Figure 6:
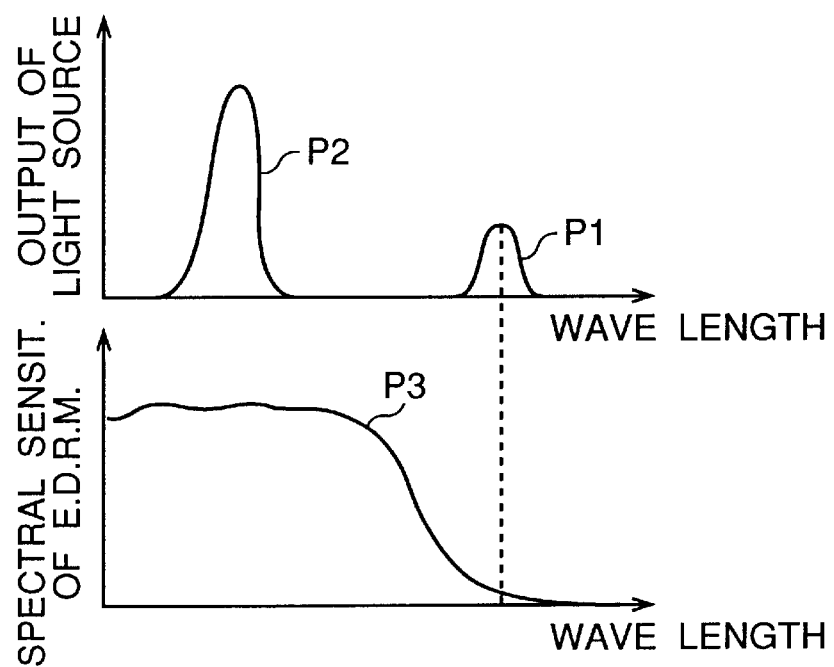
FIG. 6 is a view showing a relationship between a wave length of light emitted by the light source and an intensity of the light, and the relationship between the wave length and a spectral sensitivity of the electro-developing recording medium.

FIG. 6 is a view showing a relationship between a wave length of light emitted by the light source 42 and an intensity of the light, and a relationship between the wave length and a spectral sensitivity of the electro-developing recording medium 30. The wave length of light for the checking operation (see reference P1) is longer than the wave length of light for the reading operation (see reference P2). For example, the light for the checking operation may be infrared light. The intensity of the light for the checking operation (see reference P1) is less than the intensity of the light (see reference P2) for the reading operation (see reference P2). On the other hand, the spectral sensitivity of the electro-developing recording medium 30 becomes drastically small as the wave length becomes less than a predetermined value, as shown by reference P3. Therefore, when the light for the checking operation is emitted, the electro-developing recording medium 30 is hardly exposed.

Figure 7:
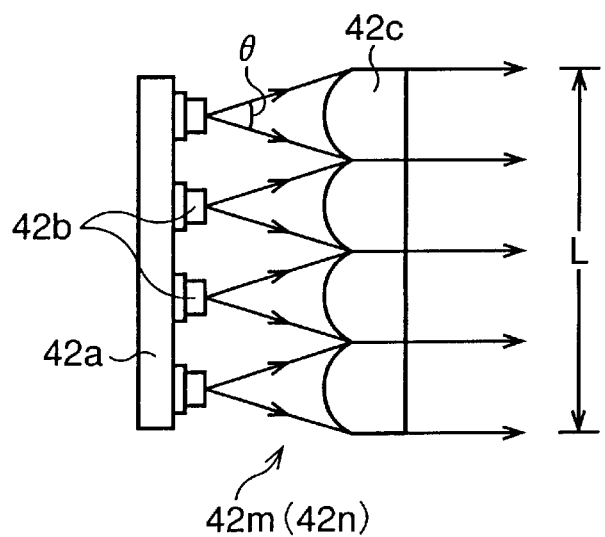
FIG. 7 is a plane view showing the light source.

FIG. 7 is a plane view showing the first and second light source units 42m and 42n included in the light source 42 (see FIG. 5). A plurality of LEDs 42b are aligned on a support frame 42a. Although there are four LEDs 42b in FIG. 5, it can be more than four. A collimating lens 42c is provided in front of the LEDs 42b. Although the spread angle θ of the light beam outputted by the LED 42b is 30° through 40°, for example, the light beam is converted to a parallel beam by the collimating lens 42c, and is radiated onto the light receiving surface of the electro-developing recording medium 30. The light beam outputted by the light source 42 has a linear shape, a length (L) of which is more than or equal to the width of the electro-developing recording medium 30, the width corresponding to the longitudinal direction of the first leg portion 52a (see FIG. 4).

Figure 8:
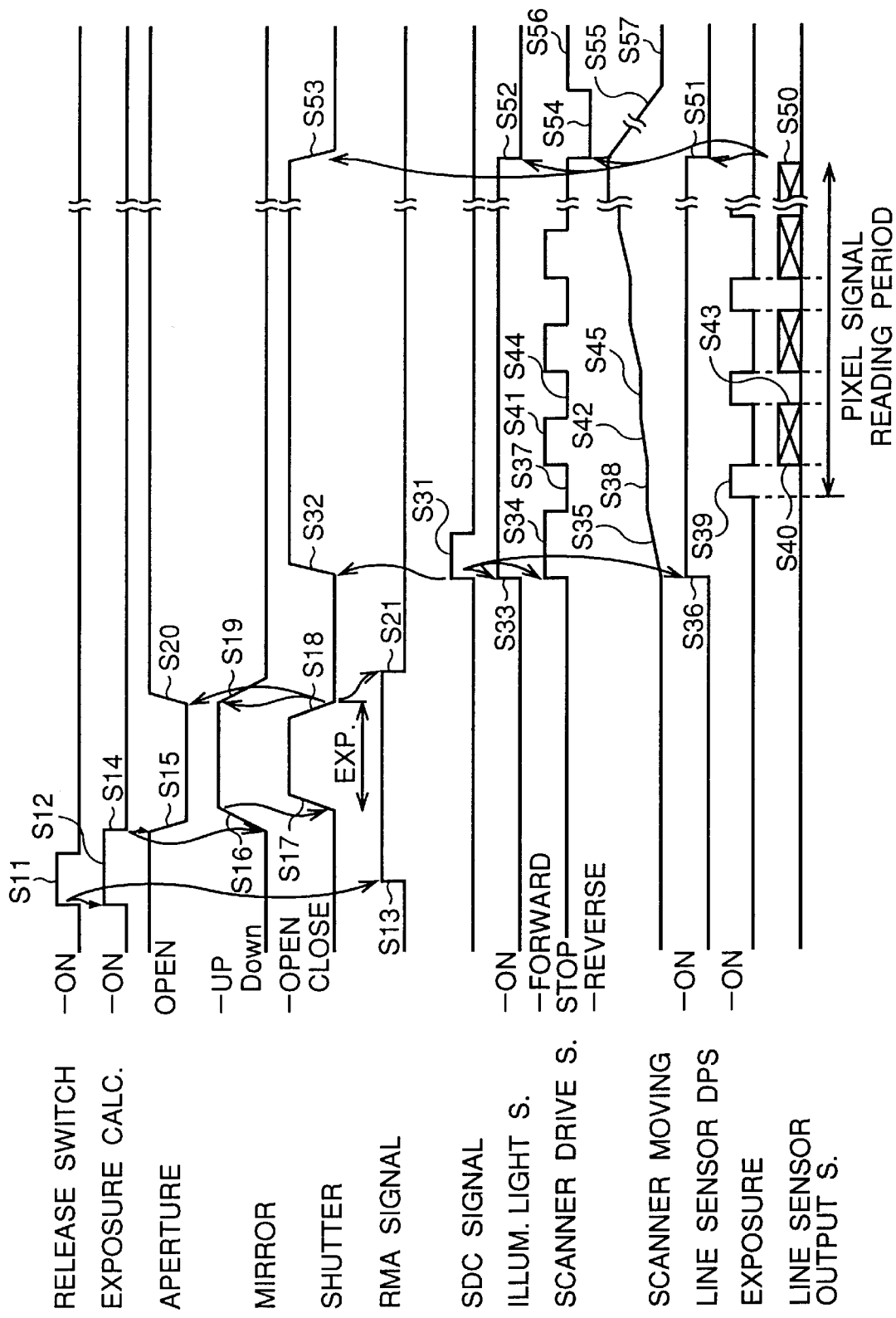
FIG. 8 is a timing chart showing a recording operation in which an image is recorded on the electro-developing recording medium, and a reading operation in which the image is read therefrom.
Figure 9:
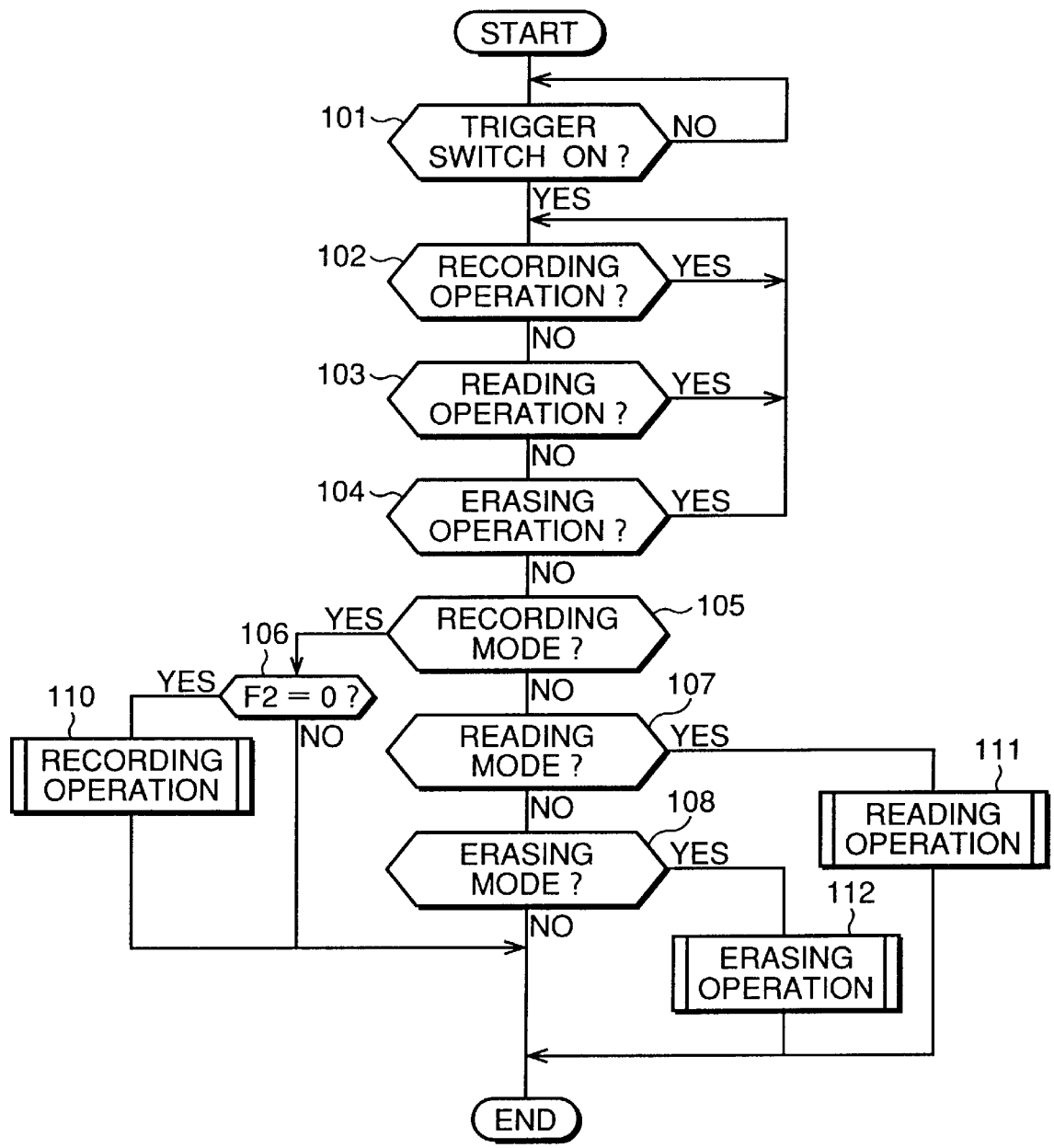
FIG. 9 is a flow chart of a program for performing a mode setting operation.
Figure 10:
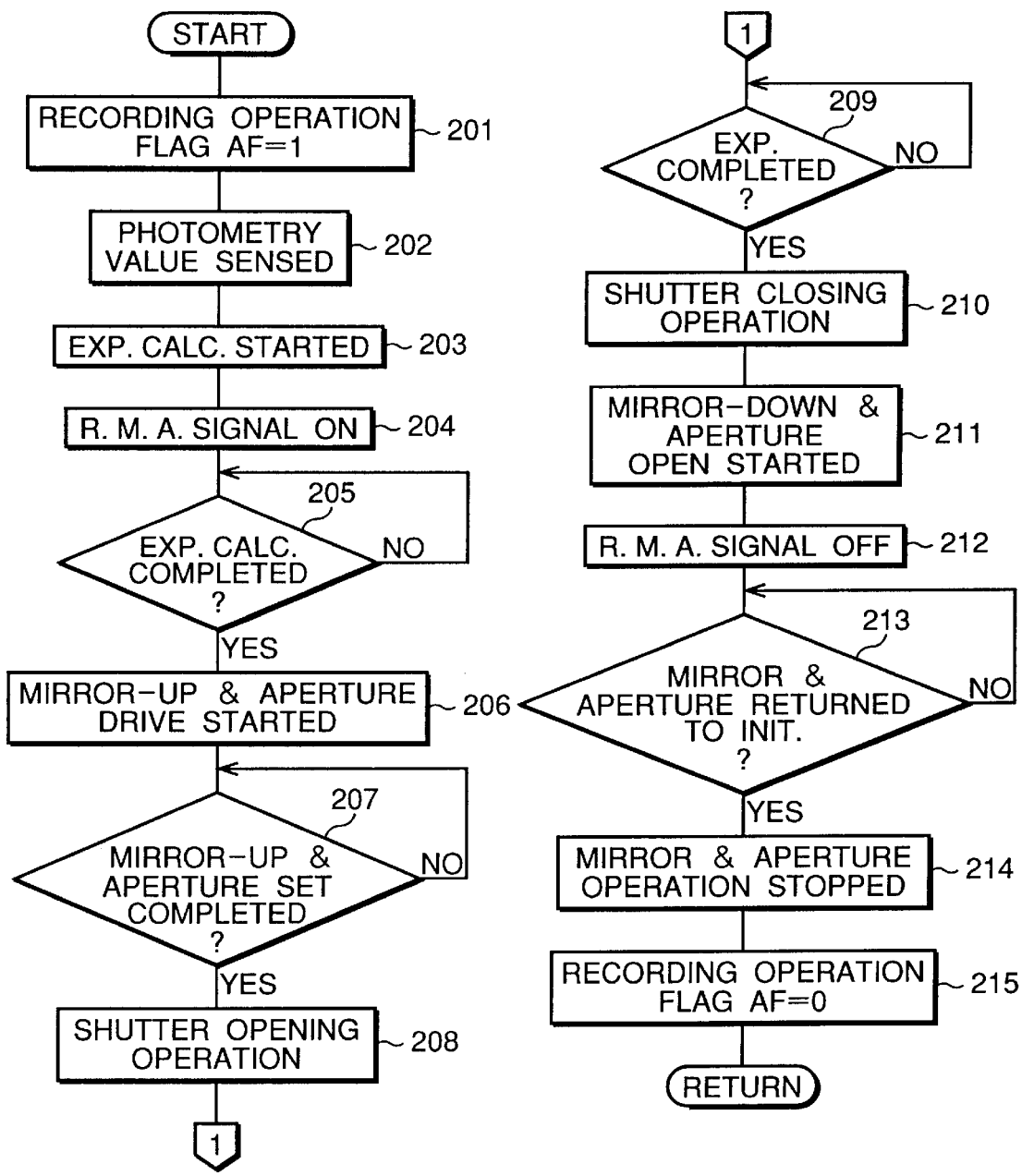
FIG. 10 is a flow chart of a program for performing a recording operation.
Figure 11A:
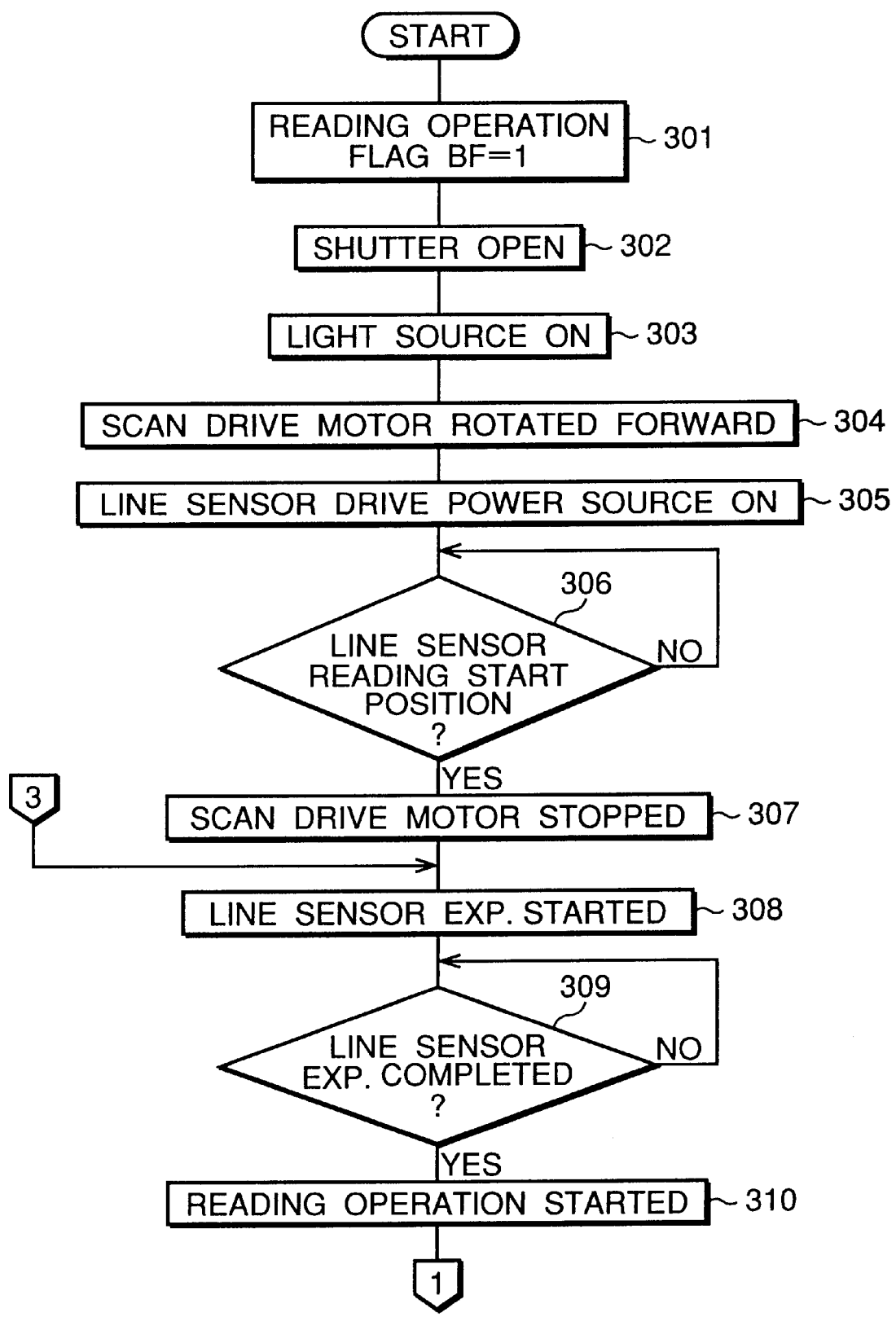
FIGS. 11A, 11B, and 11C are flow charts of a program for performing a reading operation.
Figure 11B:
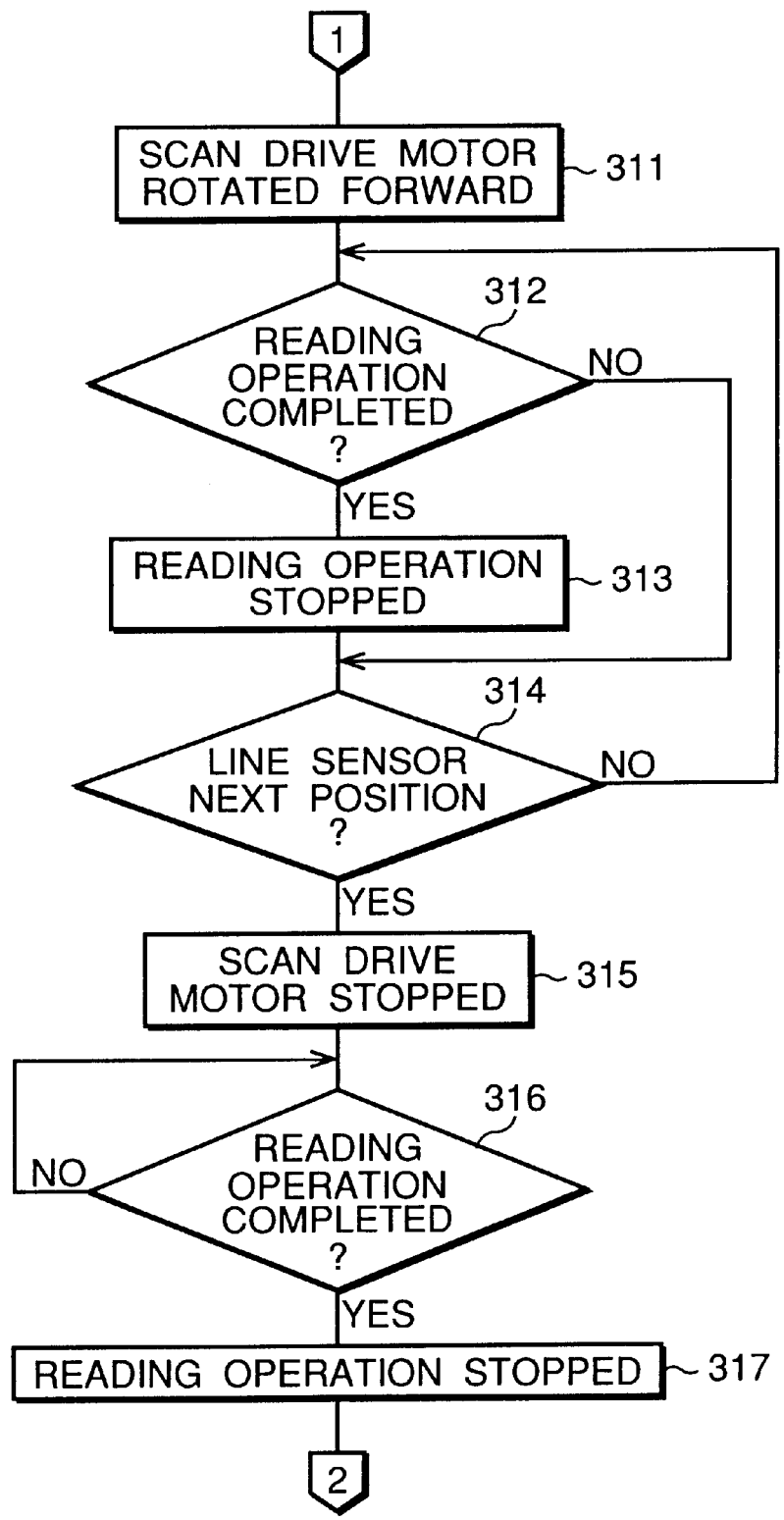
Figure 11C:
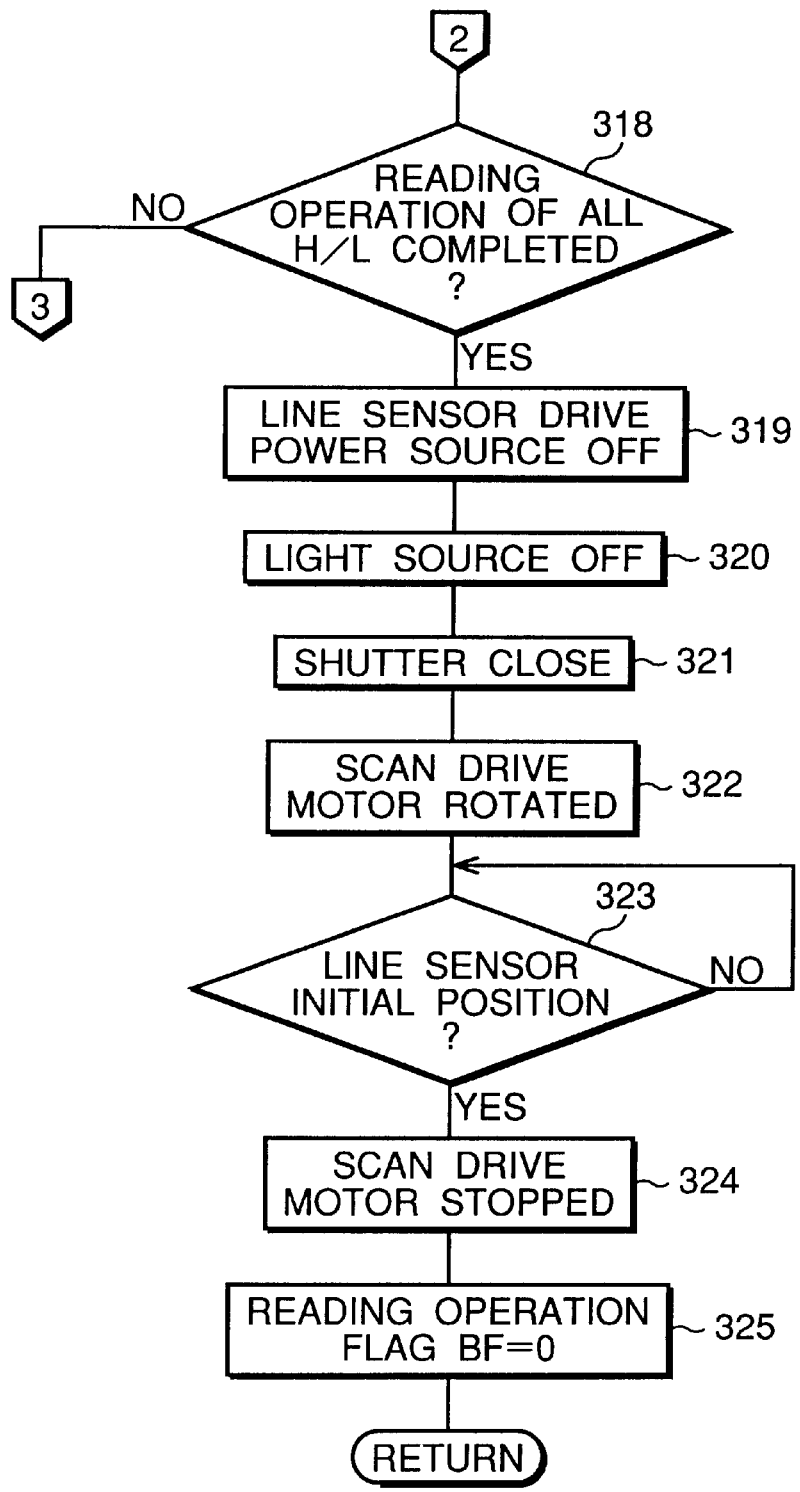

FIG. 8 is a timing chart showing a recording operation (i.e., a photographing operation) in which an image is recorded on the electro-developing recording medium 30, and a reading operation in which the image is read therefrom. FIG. 9 is a flow chart of a program for performing a mode setting operation. FIG. 10 is a flow chart of a program for performing the recording operation. FIGS. 11A, 11B, and 11C are flow charts of a program for performing the reading operation. FIGS. 12A, 12B, 12C, and 12D are flow charts of a program for performing the erasing operation. With reference to these drawings, each of the operations will be described.

Before executing these operations, the mode select switch 16 should be operated so that one of the recording, reading, and erasing operations is selected.

The interrupt program of the mode setting operation is executed at a predetermined time interval. The release switch 14 is operated as a trigger switch. When it is sensed in Step 101 that the trigger switch is turned ON, i.e., that the release switch 14 is depressed, it is determined in Step 102 whether the electro-developing type camera is in a recording operation. When a recording operation flag AF described later is set to 1, it is determined that the electro-developing type camera is in the recording operation, and thus, Step 102 is repeated. Conversely, when the electro-developing type camera is not in the recording operation, it is determined in Step 103 whether the electro-developing type camera is in a reading operation. When a reading operation flag BF described later is set to 1, it is determined that the electro-developing type camera is in the reading operation. In the reading operation, the process returns to Step 102, and in an operation other than the reading operation, it is determined in Step 104 whether the electro-developing type camera is in an erasing operation. When an erasing operation flag CF described later is set to 1, it is determined that the electro-developing type camera is in the erasing operation, and the process returns to Step 102. In an operation other than the erasing operation, the process goes to Step 105.

In Step 105, it is determined whether the recording mode is set. When the recording mode is set, the process goes to Step 106, in which it is determined whether an abnormal flag F2, to be described later, has been set to 0. When the abnormal flag F2 is not 0, namely, when the erasing operation of the electro-developing recording medium 30 has not been normally completed, for example, this program ends immediately. Conversely, when the abnormal flag F2 is 0, namely, when the electro-developing recording medium 30 is normal so that an image can be recorded, the process goes to Step 110, and thus, a subroutine of the recording operation shown in FIG. 10 is executed.

When it is determined in Step 105 that the recording mode is not set, the process goes to Step 107, in which it is determined whether the reading mode is set. When the reading mode is set, the process goes to Step 111, and thus, a subroutine of the reading operation shown in FIGS. 11A, 11B, and 11C is executed. Conversely, when the reading mode is not set, it is determined in Step 108 whether the erasing mode is set. When the erasing mode is set, the process goes to Step 112, and thus, a subroutine of the erasing operation shown in FIGS. 12A, 12B, 12C, and 12D is executed. Conversely, when none of the recording, reading, and erasing modes are set, the program ends.

The program of the recording operation shown in FIG. 10 will be described below.

When it is sensed that the release switch 14 has been depressed (reference S11), the recording operation is started. First, the recording flag AF is set to 1 in Step 201. Then, in Step 202, an output signal from the photometry sensor 28, i.e., a photometry value is sensed. In Step 203, an exposure calculation is initiated based on the photometry value (reference S12). A recording medium activating signal is outputted in Step 204 (reference S13), so that an electric voltage is applied to the electro-developing recording medium 30. When the completion of the exposure calculation is confirmed in Step 205 (reference S14), the recording operation is performed in Step 206 and the remaining Steps in accordance with the calculation result.

In Step 206, the degree of opening of the aperture 12a is adjusted from the fully open state to a predetermined degree of opening (reference S15), and the quick return mirror 21 is changed from the down position to the up position (reference S16). Upon confirmation in Step 207 that the quick return mirror 21 has been changed to the up position and the adjustment of degree of opening the aperture 12a has been completed, the shutter 22 is opened in Step 208 (reference S17).

When the exposure time obtained based on the exposure calculation has elapsed and it is confirmed in Step 209 that the exposure has been completed, the shutter 22 is closed in Step 210 (reference S18). With the completion of the closing operation of the shutter 22, Step 211 is executed so that a rotation of the mirror 21 to the down position is started (reference S19) and a return to a fully open state of the aperture 12a is started (reference S20). In Step 212, the output of the recording medium activating signal is stopped (reference S21).

Thus, the recording medium activating signal is continuously output at least while the shutter 22 is open, and during this period, a predetermined voltage is applied to the electro-developing recording medium 30. By exposing the electro-developing recording medium 30 under this condition, the object image is developed on the electro-developing recording medium 30 as a visible image, which is held on the electro-developing recording medium 30 even after the output of the recording medium activating signal is stopped.

When it is confirmed in Step 213 that the mirror 21 and the aperture 12a have returned to the initial conditions thereof, respectively, the operations of the mirror 21 and the aperture 12a are stopped in Step 214. In Step 215, the recording operation flag AF is reset to 0, and this recording operation ends.

The program of the reading operation shown in FIGS. 11A, 11B, and 11C will be described below.

When the trigger switch (i.e., the release switch 14) is pressed under the condition in which the reading mode is selected, a scanning command signal is outputted (reference S31), so that the program of the reading operation is executed.

In Step 301, the reading operation flag BF is set to 1, and in Step 302, the shutter 22 is opened (reference S32). In Step 303, the light source 42 is turned ON, and the "HI" control signal (A) and the "LO" control signal (B) are outputted by the system control circuit 20. Namely, the first light source unit 42m of the light source 42 is lit. Thus, the electro-developing recording medium 30 is illuminated (reference S33).

In Step 304, a scanner drive signal is outputted (reference S34), so that the scan drive motor 55 rotates in a forward direction. Thus the moving member 52 of the scanning mechanism 50 starts to move upward from the lowest position of the electro-developing recording medium 30 (reference S35), i.e., from the initial position of the scanning mechanism 50. In Step 305, a line sensor drive power source included in the line sensor drive circuit 47 is turned ON (reference S36).

When it is confirmed in Step 306 that the line sensor 44 has been set at a reading start position (i.e., the first horizontal scanning line of the image to be scanned), the output of the scanner drive signal is stopped in Step 307 (reference S37). Thus the scan drive motor 55 is stopped (reference S38). This stopping operation is controlled by counting pulse signals, for example, used for rotating the scan drive motor 55.

Then, in Step 308, an exposure of the line sensor 44 is started, so that an accumulation of an electric charge by the line sensor 44 is performed (reference S39). When it is confirmed in Step 309, by sensing that, for example, a constant time has passed, that the exposure of the line sensor 44 has been completed, in Step 310, a reading operation of the line sensor 44 is started, and pixel signals of one horizontal scanning line are outputted from the line sensor 44 (reference S40). In Step 311, the scanner drive signal for rotating the scan drive motor 55 in a forward direction is outputted (reference S41), so that the moving member 52 moves upward (reference S42).

During this movement of the moving member 52, when it is confirmed in Step 312 that a reading scan of the line sensor 44 has been completed, the reading scan is stopped in Step 313 (reference S43). Note that the completion of the reading scan is controlled by counting pulse signals, for example, which are outputted from the line sensor drive circuit 47 to drive the line sensor 44. When the completion of the reading scan is not confirmed in Step 312, Step 313 is skipped and Step 314 is executed, so that it is determined whether the line sensor 44 has been set at the position of the next horizontal scanning line, i.e., the next reading position. When the line sensor 44 has not been set at the position of the next horizontal scanning line, Steps 312 through 314 are executed again.

When it is confirmed in Step 314 that the line sensor 44 has been set at the position of the next horizontal scanning line, the output of the scanner drive signal is stopped in Step 315 (reference S44). Thus the scan drive motor 55 is stopped (reference S45). Then, in Step 316, the completion of the reading scan of the line sensor 44 is confirmed, in the same way as for Step 312, and the reading scan is stopped in Step 317. Namely, even when the loop of Steps 312 through 314 ends without executing Step 313, the reading scan of the line sensor 44 is completed in Step 317.

In Step 318, it is determined whether a reading scan for all of the horizontal scanning lines has been completed. The number of all of the horizontal scanning lines may be 2000, for example, and in Step 318, it is determined whether the counter value, which counts every reading operation of one horizontal scanning line, has reached 2000. When the reading operation of all of the horizontal scanning lines has not been completed, the process returns to Step 308, and the operations described above in Steps 308 through 318 are repeated.

When all of the horizontal scanning lines have been read (reference S50), the process goes from Step 318 to Step 319. In Step 319, the drive power source of the line sensor 44 is turned OFF (reference S51), and in Step 320, the light source 42 is turned OFF (reference S52). Namely, the control signals (A) and (B) are both set to L0. In Step 321, the shutter 22 is closed (reference S53), and in Step 322, a scanner drive signal for operating the scan drive motor 55 in the rearward direction is outputted (reference S54). Thus the moving member 52 starts to descend (reference S55).

During the descending movement of the moving member 52, when it is confirmed in Step 323 that the line sensor 44 has returned to the initial position of the scanning mechanism 50, the output of the scanner drive signal is stopped in Step 324 (reference S56), so that the scan drive motor 55 is stopped (reference S57). Note that the sensing operation of the initial position executed in Step 323 is performed based on a signal outputted when part of the moving member 52 transverses a photo-interrupter (not shown). Then, the reading operation flag BF is reset to 0 in Step 325, the program of the reading operation ends.

The program of the erasing operation shown in FIGS. 12A, 12B, 12C, and 12D will be described below.

When the trigger switch (i.e., the release switch 14) is pressed under condition in which the erasing mode is selected, an erasing command signal is outputted, so that the program of the erasing operation is executed. The erasing operation, the moving member 52 of the scanning mechanism 50 is not intermittently moved as in the reading operation shown in FIG. 8, but is continuously (or smoothly) moved.

In Step 401, erasing operation flag CF is set to 1, and in Step 402, the erasing device 48 is turned ON.

In Step 403, a scanner drive signal is outputted, so that the scan drive motor 55 rotates in a forward direction. Thus the moving member 52 of the scanning mechanism 50 starts to move upward from the lowest position. As a result, the electro-developing recording medium 30 is heated by the erasing device 48, so that a part of the image, to which the erasing device 48 faces, is erased. In Step 404, it is determined whether an image has been erased in all of the horizontal scanning lines. When all of the horizontal scanning lines has been erased, i.e., when the erasing device 48 has been moved from the lower end of the recording area to the upper end thereof, the output of the scanner drive signal is stopped in Step 405, so that the scan drive motor 55 is stopped. In Step 406, the erasing device 48 is turned OFF.

In Step 407, a scanner drive signal for operating the scan drive motor 55 in the rearward direction is outputted, and thus the moving member 52 starts to descend. During the descending movement of the moving member 52, when it is confirmed in Step 408 that the moving member 52 has returned to the initial position of the scanning mechanism 50, the output of the scanner drive signal is stopped in Step 409, so that the scan drive motor 55 is stopped. In Step 410, an erasure completion flag F1 is set to 1, and in Step 411, the erasing operation flag CF is reset to 0.

Then, in Step 412 and the remaining Steps, the recording state of the electro-developing recording medium 30 is checked. Namely, it is determined whether the erasing operation has been properly carried out by the erasing device 48. This determining operation is similar to the reading operation, so that the moving member 52 of the scanning mechanism 50 is stopped at every horizontal scanning line, and is intermittently moved upward. The different point of the determining operation from the reading operation is that, in the determining operation, the intensity of light outputted by the light source 42 is relatively small, and the wave length of light is relatively long.

In Step 412, the shutter 22 is opened. In Step 413, the light source 42 is turned ON, and the LO control signal (A) and the HI control signal (B) are outputted by the system control circuit 20. Namely, the second light source unit 42n of the light source 42 is lit. Thus, the electro-developing recording medium 30 is illuminated by the light which has the intensity of light smaller than in the reading operation, and has the wave length longer than in the reading operation.

In Step 414, the scan drive motor 55 rotates in a forward direction. Thus the moving member 52 of the scanning mechanism 50 starts to move upward from the lowest position of the electro-developing recording medium 30. In Step 415, a line sensor drive power source included in the line sensor drive circuit 47 is turned ON. When it is confirmed in Step 416 that the line sensor 44 has been set at a reading start position, the scan drive motor 55 is stopped in Step 417.

In Step 418, an exposure of the line sensor 44 is started, so that an accumulation of an electric charge by the line sensor 44 is performed. When it is confirmed in Step 419 that the exposure of the line sensor 44 has been completed, in Step 420, a reading scan of the line sensor 44 is started, and pixel signals of one horizontal scanning line are outputted from the line sensor 44. In Step 421, the scan drive motor 55 is rotated in a forward direction, so that the moving member 52 moves upward.

During this movement of the moving member 52, upon confirmation in Step 422 that the reading scan of the line sensor 44 has been completed, the reading scan is stopped in Step 423. When the completion of the reading scan is not confirmed in Step 422, Step 423 is skipped and Step 424 is executed, so that it is determined whether the line sensor 44 has been set at the position of the next horizontal scanning line, i.e., the next reading position. When the line sensor 44 has not been set at the position of the next horizontal scanning line, Steps 422 through 424 are executed again.

When it is confirmed in Step 424 that the line sensor 44 has been set at the position of the next horizontal scanning line, the scan drive motor 55 is stopped in Step 425. Then, in Step 426, the completion of the reading operation of the line sensor 44 is confirmed, and the reading scan is stopped in Step 427. Namely, even when the loop of Steps 422 through 424 ends without executing Step 423, the reading scan of the line sensor 44 is completed in Step 427.

In Step 428, the maximum value and the minimum value of pixel signals included in one horizontal scanning line read in Steps 420 through 427 are detected. In Step 429, it is determined whether the difference between the maximum value and the minimum value of the pixel signals read in Step 428 is lower than a first predetermined value. Namely, it is determined whether a contrast in one horizontal scanning line is less than a predetermined value. When the difference between the maximum value and the minimum value is less than the first predetermined value, it is determined in Step 430 whether the minimum value of the pixel signals of the horizontal scanning line is less than a second predetermined value. When the minimum value is less than the second predetermined value, it is judged that the pixel signals of the horizontal scanning line has been erased.

In Step 431, it is determined whether a reading scan for all of the horizontal scanning lines has been completed. When the reading operation of all of the horizontal scanning lines has not been completed, the process returns to Step 418, and the operations described above in Steps 418 through 431 are repeated.

When it is determined in Step 431 that all of the horizontal scanning lines have been read, the process goes to Step 432, in which an abnormal flag F2 is reset to 0. Then, in Step 433, the drive power source of the line sensor 44 is turned OFF, and in Step 434, the light source 42 is turned OFF. Namely, the control signals (A) and (B) are both set to LO, so that the second light source unit 42n is turned OFF. In Step 435, the shutter 22 is closed, and in Step 436, the scan drive motor 55 is rotated in the rearward direction. Thus the moving member 52 starts to descend.

During the descending movement of the moving member 52, when it is confirmed in Step 437 that the moving member 52 has returned to the initial position of the scanning mechanism 50, the scan drive motor 55 is stopped in Step 438, and the program of the reading operation ends.

Thus, when the erasing operation is properly carried out and the pixel signals of all of the horizontal scanning lines of one image have been erased, the abnormal flag F2 is reset to 0.

On the other hand, when it is determined in Step 429 that the difference between the maximum value and the minimum value is greater than the first predetermined value, and when it is determined in Step 430 that the difference between the minimum value is greater than the second predetermined value, the process goes to Step 441, in which it is determined whether the erasure completion flag F1 is 0. The erasure completion flag F1 is set to 1 in Step 410 when the erasing operation is completed, and is reset to 0 in Step 501 of a mount operation program shown in FIG. 13 when an electro-developing recording medium 30 is mounted in the electro-developing type camera. Therefore, when the erasure completion flag F1 is 0, an image has probably been recorded on the electro-developing recording medium 30. Thus, a warning, meaning that the electro-developing recording medium 30 has been recorded, is indicated by the display device 68 in Step 442. Conversely, when the erasure completion flag F1 is 1, it is determined that the erasing operation performed to the electro-developing recording medium 30 was improper. Thus the warning, meaning that the erasing operation was improper, is indicated by the display device 68 in Step 443. Then, in Step 444, the abnormal flag F2 is set to 1, and Step 433 and Steps following Steps 433 are executed, and thus, the erasing operation ends.

Figure 13:
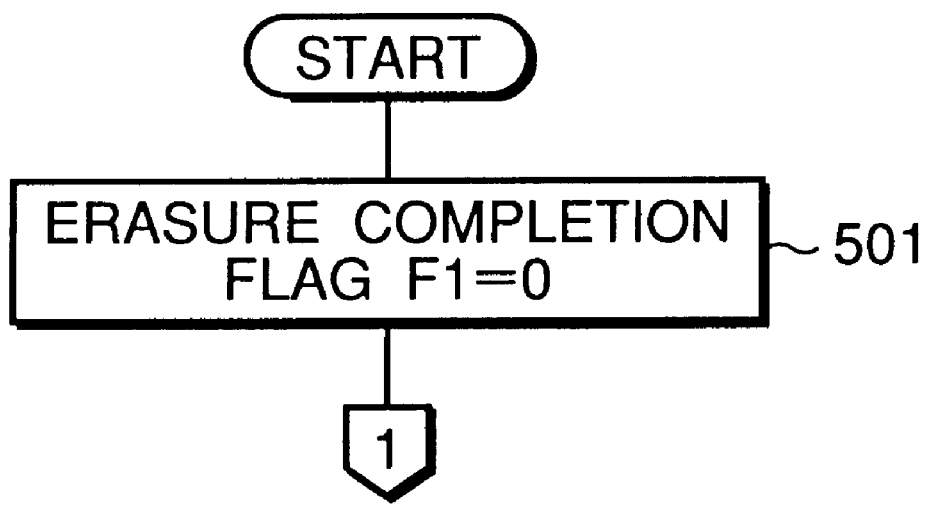
FIG. 13 is a flow chart of a program for performing a mounting operation.

FIG. 13 is a flow chart of a program for performing a mounting operation. This interrupt program is executed by turning ON a recording medium sensing switch (not shown) when the electro-developing recording medium 30 is mounted in the electro-developing type camera.

Figure 12A:
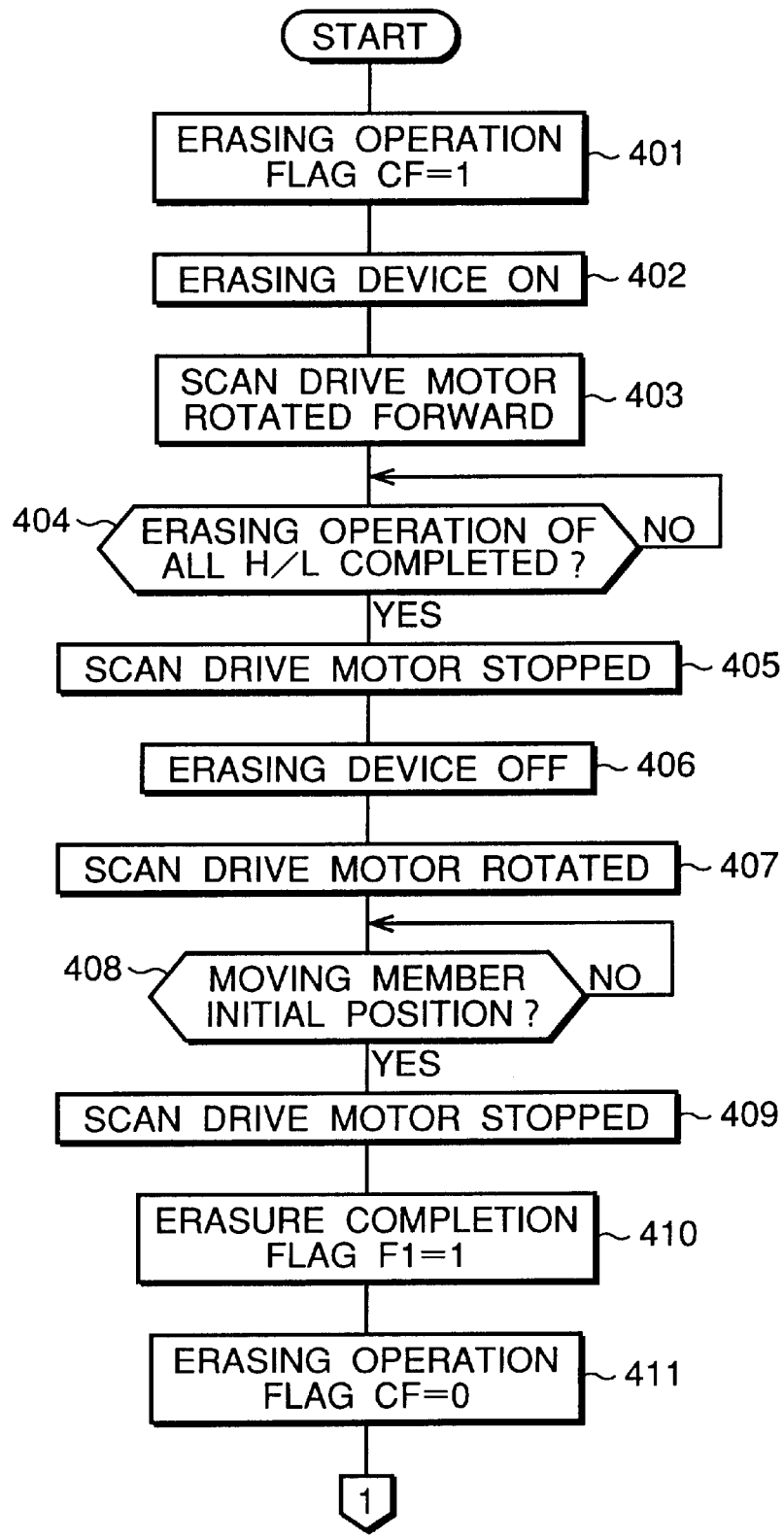
FIGS. 12A, 12B, 12C, and 12D are flow charts of a program for performing an erasing operation.
Figure 12B:
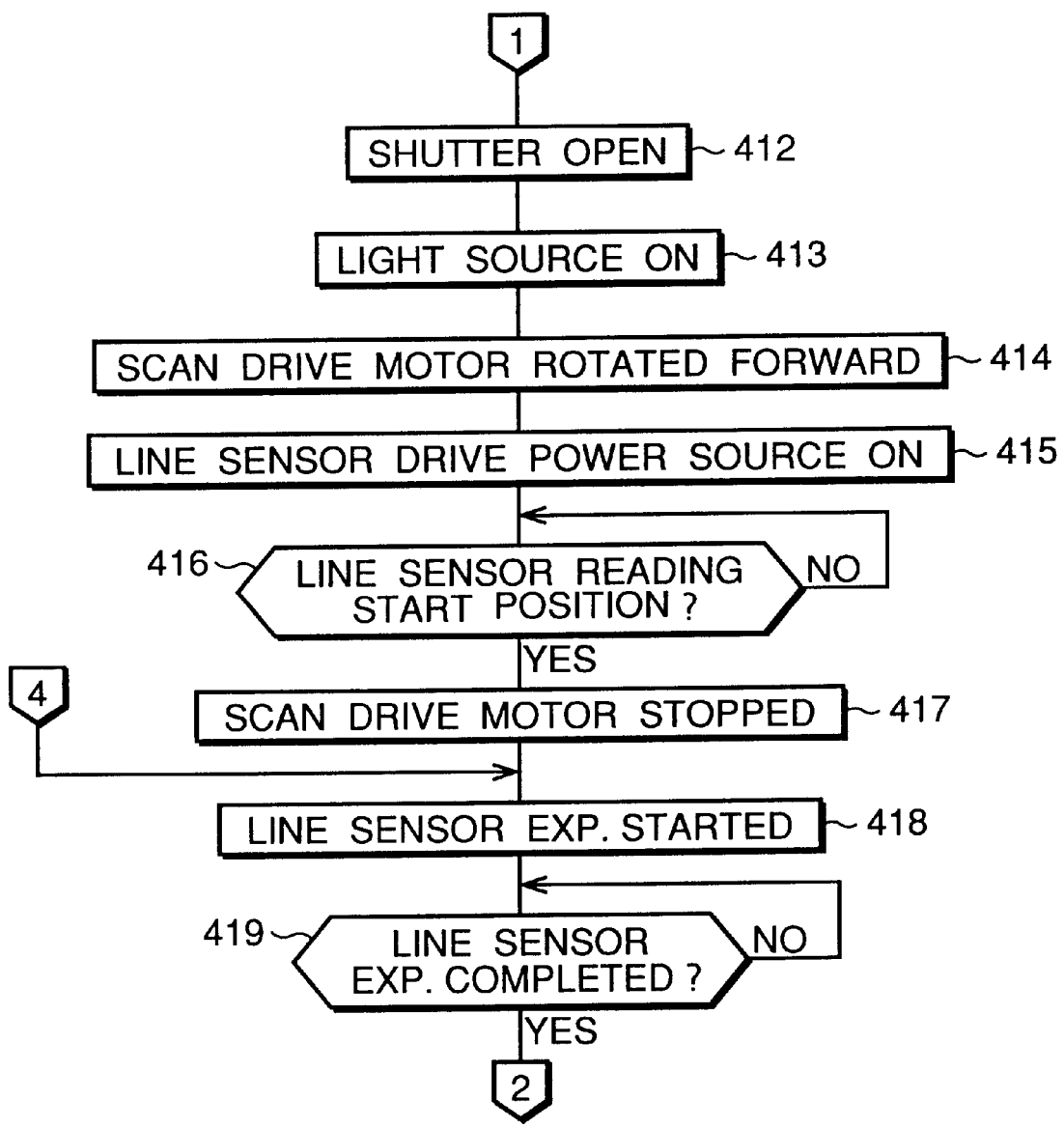
Figure 12C:
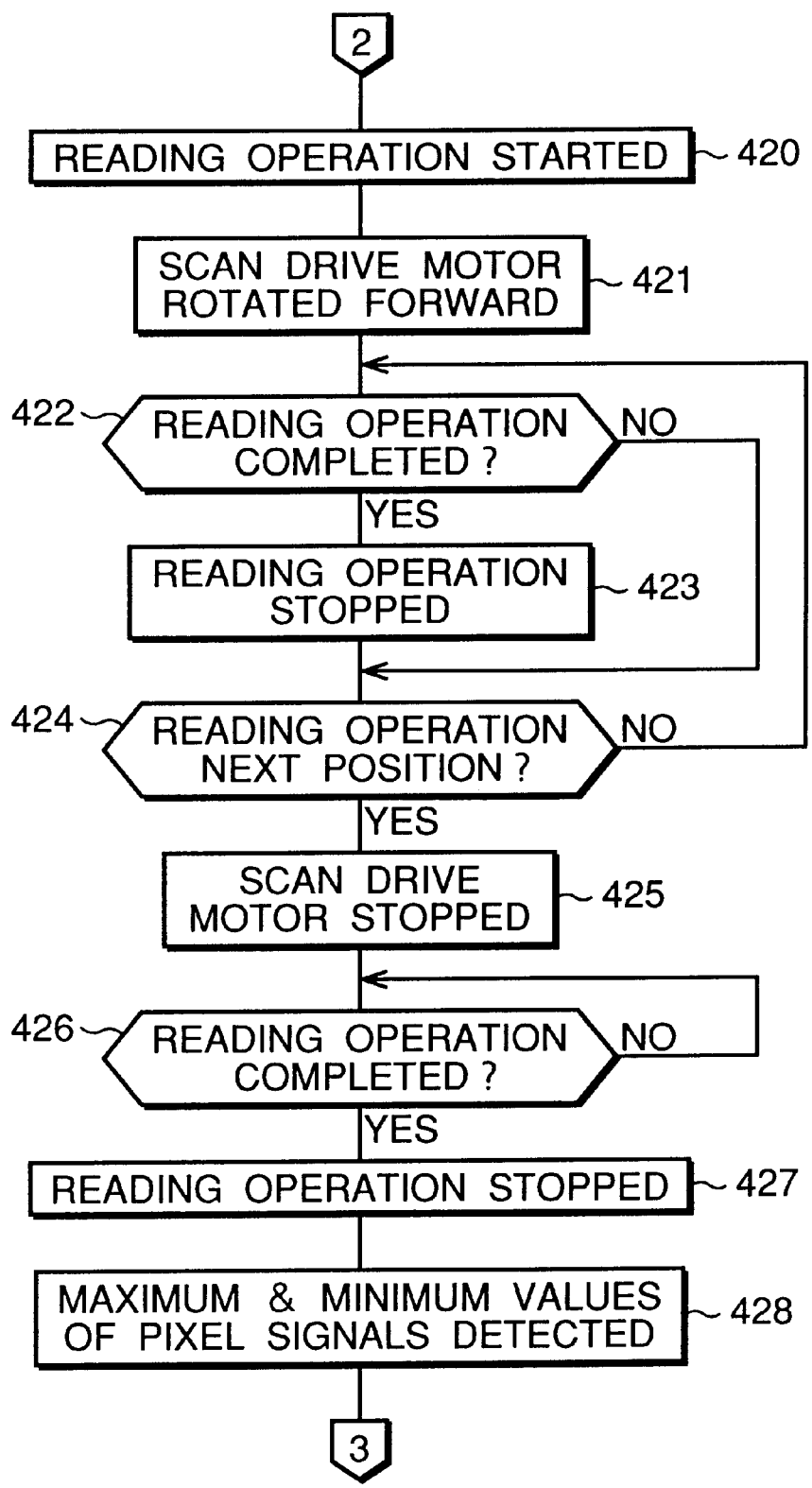
Figure 12D:
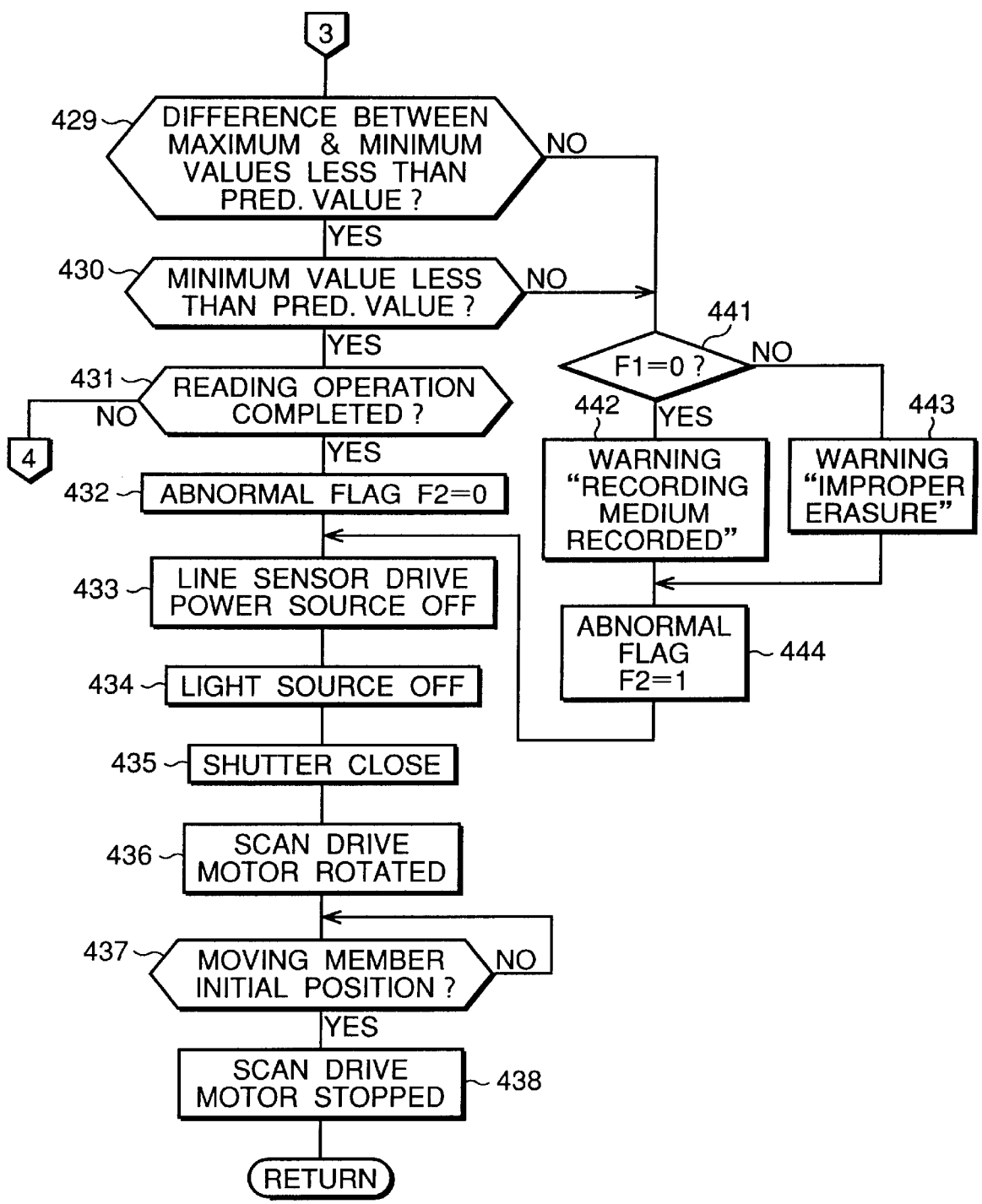

In Step 501, the erasure completion flag F1 is reset to 0. Then, steps similar to steps of the erasing operation, i.e., Steps shown in FIGS. 12A, 12B, and 12C are executed. As a result, when an image has been recorded on the mounted electro-developing recording medium 30, a warning, meaning that the electro-developing recording medium 30 has been recorded, is indicated by the display device 68 in Step 442, and when no image has been recorded on the mounted electro-developing recording medium 30, the abnormal flag F2 is reset to 0 in Step 432.

As described above, in the embodiment of the present invention, before the recording operation in which an image is recorded on the electro-developing recording medium 30, the recording state of the electro-developing recording medium 30 is checked. Therefore, in the next recording operation, a clear image is surely recorded on the electro-developing recording medium 30.

Note that, although the line sensor 44 is moved to read the image recorded on the electro-developing recording medium 30 in the embodiment of the present invention, the electro-developing recording medium 30 may be moved so that the image is read by the line sensor 44.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. HEI 8-50919 (filed on Feb. 14, 1996) which is expressly incorporated herein, by reference, in its entirety.

I claim:

1. A check device mounted in an electro-developing type camera using an electro-developing recording medium by which an image formed thereon is electronically developed, said check device comprising:

a light source that outputs one of an illumination light to illuminate said electro-developing recording medium during a reading operation, and a check light that illuminates said electro-developing recording medium during a checking operation, a wave length of said check light differing from a wavelength of said illumination light;

an optical sensor that reads said image formed on said electro-developing recording medium, which is being illuminated by said light source, to output an image signal corresponding to said image;

a moving mechanism that moves one of said optical sensor and said electro-developing recording medium so that said image is read by said optical sensor;

a processor that controls said light source, said optical sensor and said moving mechanism, such that said light source outputs said check light, and said optical sensor reads said image recorded on said electro-developing mechanism; and a recording state check processor that checks whether said electro-developing recording medium can be used for a recording operation, based upon said image read by said optical sensor.

2. A check device according to claim 1, wherein said recording state check processor checks said recording state before a recording operation in which an image is recorded on said electro-developing recording medium.

3. A check device according to claim 1, further comprising a first light source control processor that controls an intensity of light outputted by said light source, so that, when said recording state check processor checks said recording state, said intensity of light is smaller than when said image is read by said optical sensor.

4. The check light device of claim 1, wherein said wave length of said check light is longer than said wave length of said illumination light.

5. A check device according to claim 1, further comprising an image erasing processor that erases said image recorded on said electro-developing recording medium.

6. A check device according to claim 5, wherein said image erasing processor heats said electro-developing recording medium to erase said image recorded thereon.

7. A check device according to claim 6, wherein said image erasing processor comprises a heater movable along said electro-developing recording medium.

8. A check device according to claim 5, wherein said recording state check processor checks said recording state after an erasing operation by said image erasing processor.

9. The check device of claim 1, wherein said recording state check processor comprises a difference detecting processor that detects a difference between a maximum value and a minimum value of pixel signals included in one horizontal scanning line of said image signal, and a difference check processor that determines whether said difference is less than a first predetermined value.

10. A check device according to claim 9, wherein said recording state check processor further comprises a warning processor that outputs a first warning when said difference is not less than said first predetermined value, said first warning indicating that said electro-developing medium has been subjected to one of a recording operation and an image recorded on said electro-developing recording medium that has not been completely erased.

11. A check device according to claim 9, wherein said recording state check processor further comprises a minimum value check processor for determining, when said difference is less than said first predetermined value, and whether said minimum value is less than a second predetermined value.

12. A check device according to claim 11, wherein said recording state check processor further comprises a second warning processor that outputs a second warning when said minimum value is not less than said second predetermined value, said second warning indicating that said electro-developing recording medium has been subjected to one of a recording operation and an image recorded on said electro-developing recording medium that has not been completely erased.

13. A device according to claim 1, wherein said electro-developing recording medium comprises an electrostatic information recording medium that generates an electric charge in accordance with an image formed thereon, and an electric charge storage medium which generates a visible image in accordance with said electric charge and which can hold said visible image.

14. A device according to claim 13, wherein said electric charge storage medium comprises a liquid crystal display having a memory-type liquid crystal.

15. A check device provided in an electro-developing type camera using an electro-developing recording medium, by which an image formed thereon is electronically developed, said check device comprising:

a light source that illuminates said electro-developing recording medium during a checking operation;

an optical sensor that reads said image formed on said electro-developing recording medium, which is being illuminated by said light source, to output an image signal corresponding to said image;

a moving mechanism that moves one of said optical sensor and said electro-developing recording medium so that said image is read by said optical sensor; and a recording state check processor that determines whether said electro-developing recording medium is fully erased.

* * * * *

UNITED STATES PATENT AND TRADEMARK OFFICE
CERTIFICATE OF CORRECTION

PATENT NO. : 5,940,649
DATED : August 17, 1999
INVENTOR(S) : K. Sato

It is certified that error appears in the above-identified patent and that said Letters Patent is hereby corrected as shown below:

Title page, item [73], Assignee, after "Asahi" insert --Kogaku--.

Signed and Sealed this

Thirtieth Day of May, 2000

Attest:

Q. TODD DICKINSON

Attesting Officer

Director of Patents and Trademarks